Nov. 24, 1931.    N. B. GREEN    1,833,459
BELLOWS FRAME CONSTRUCTION FOR CAMERAS
Filed Oct. 6, 1930
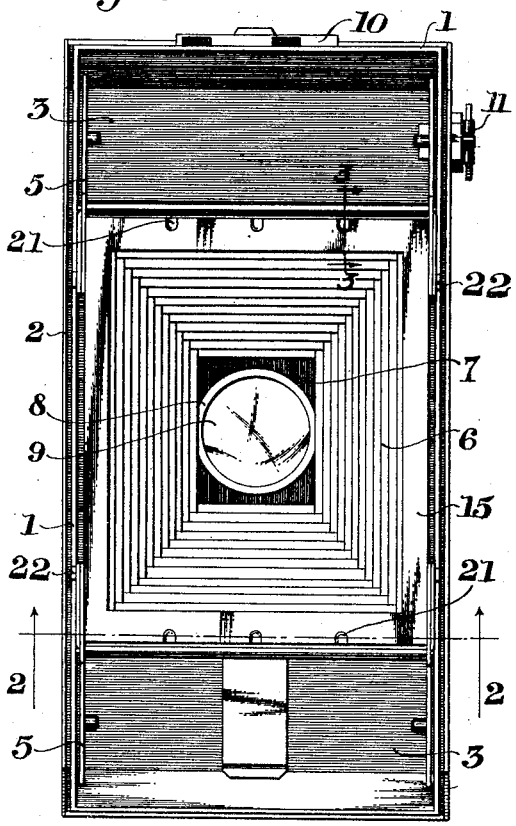
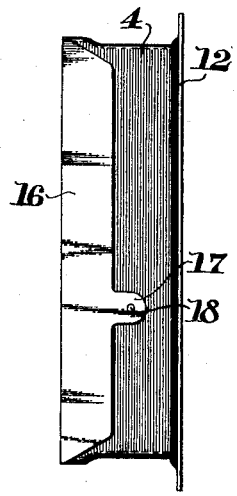
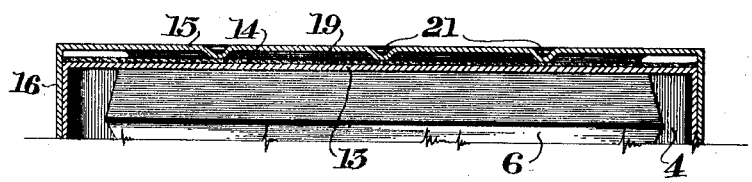
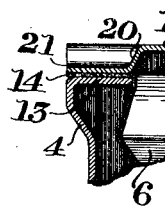
Inventor
Newton B. Green,
By
George A. Gillette, Jr.
Attorneys Patented Nov. 24, 1931

1,833,459

UNITED STATES PATENT OFFICE

NEWTON B. GREEN, OF ROCHESTER, NEW YORK, ASSIGNOR TO EASTMAN KODAK COMPANY, OF ROCHESTER, NEW YORK, A CORPORATION OF NEW YORK

BELLOWS FRAME CONSTRUCTION FOR CAMERAS

Application filed October 6, 1930. Serial No. 486,653.

This invention relates to a bellows frame construction for a folding camera and more particularly to a bellows frame construction which simultaneously provides an air passage between the casing of the camera and the interior of the bellows.

The objects of my invention are to provide in a folding camera a bellows frame which firmly secures the last fold of the bellows, which simultaneously provides an air valve for the interior of the bellows, which can be readily manufactured and which can be readily mounted or demounted with respect to the camera.

The aforesaid objects are embodied in a construction which comprises a bellows frame riveted to a flange on the inner wall of the camera body, the last or rear fold of the bellows being adjacent to said flange, and embossings or depressions formed in said bellows frame, abutting the last fold of the bellows to accomplish or reinforce the fixation thereof, to maintain said bellows frame and wall flange of the body in spaced relation, and to provide an air passage or air valve therebetween.

The accompanying drawings illustrate the preferred embodiment of my invention. Similar elements are denoted by similar reference numerals on said drawings, and the several figures represent the following:

Fig. 1 is a rear view of the folding camera in closed position and with the back removed.

Fig. 2 is a transverse cross section of the bellows frame construction on the line II—II of Fig. 1.

Fig. 3 is a fragmentary cross section of the bellows frame construction on the line III—III of Fig. 1.

Fig. 4 is a side elevation of the bellows frame riveted to the inner wall of the camera body.

The improved bellows construction of this invention may be embodied in several types of known folding cameras. For purposes of illustration, however, the following description shows the bellows frame applied to a folding camera having a body 1, side plates 2, spool chambers 3, an inner wall 4, a winding key 11 fastened through side plates 2 to body 1, a bellows 6, lens board 7, lens cell 8, an objective 9 mounted therein, and a catch 10 on one end of the camera body adapted to receive hooks on the hinged back (not shown).

The inner wall 4 has an integral front right angle extension 12 fastened to the body 1, and has a rear inwardly extending wall flange 13 around the entire perimeter of inner wall 4. The rear or last fold 14 of the bellows 6 is adjacent to the rear or back surface of said wall flange.

The bellows frame 15 has a right angle side flange 16 along each outer edge thereof, and a tongue 17 protrudes from each side flange 16. A rivet 18 fastens each of the tongues 17 to said inner wall 4. The bellows frame 15 also has an inwardly extending right angle flange 19 around the inner edge thereof providing a passage 20, see Fig. 3, to the interior of bellows 6.

A plurality of depressions or embossings 21 are provided along the end edges of the bellows frame 15, extending only a portion of the distance across the end of said frame 15, and abutting the last fold 14 of the bellows 6 to reinforce the cementing of said last fold 14. At the same time embossings 21 insure that the bellows frame 15 will be held in spaced relation to the last fold 14 of the bellows 6 so that an air valve is provided between the interior of bellows 6 and spool chambers 3 through passage 20 and the space between the last fold 14 of the bellows 6 and the bellows frame 15.

Spool carriages 5 are swingingly mounted on the side flanges 16 of bellows frame 15 by means of pivots 22, thus making spool carriages 5 more accessible for repair since they can be removed by merely drilling out the rivets 18 and removing the entire bellows frame 15. The cemented joint for the last fold of the bellows 6 is also rendered more accessible in the same manner.

The last fold 14 of the bellows 16 may be held in position against the wall flange 13 solely by the plurality of embossings 21, or said last fold 14 may be attached to the rear surface of said wall flange 13, and the embossings 21 will then supplement and reinforce the attachment, such as a cemented joint, thus formed.

A distinct advantage of the construction of the invention is that the bellows frame 15 presents a flat plane surface to the film hitherto unattainable in bellows frame constructions having air valves and the film substantially covering the entire bellows frame.

It should also be noted, that when the last fold 14 of the bellows 6 is attached to wall flange 13 by some extraneous means, then since the side flanges 16 are riveted to the inner wall 4, wall flange 13 and frame 15 are held in spaced relation and the spacing and holding function of embossings 21 is no longer required and they may be omitted.

Since many variations of my invention will be obvious to those skilled in the camera art, this disclosure is to be construed in an illustrative and not in a limiting sense, the scope of my invention being defined in the following claims:

Having now particularly described my invention, what I desire to protect by Letters Patent of the United States, and what I claim is:

1. A bellows construction for cameras comprising an inner wall flange, a bellows frame having side flanges spaced from said wall flange and a bellows attached to said wall flange, said bellows frame being spaced from said wall flange permitting air to pass between the bellows frame, the bellows and wall flange to and from the interior of the bellows.

2. A bellows frame construction for a camera comprising an inner wall having an inwardly extending wall flange, a bellows having the last fold thereof adjacent the said wall flange, and a bellows frame provided with a plurality of embossings abutting the last fold of said bellows, whereby said bellows is fastened and an air valve is provided therefor.

3. A bellows frame construction for a camera comprising an inner wall having an inwardly extending wall flange, a bellows having the last fold thereof cemented to said wall flange, and a bellows frame fastened to said inner wall and provided with a plurality of embossings abutting the last fold of said bellows, whereby the cementing of said bellows is reinforced and an air valve is provided therefor.

4. A bellows frame construction for a camera comprising an inner wall having an inwardly extending wall flange, a bellows having the last fold thereof adjacent to said wall flange, a bellows frame provided with a plurality of embossings abutting the last fold of said bellows, side flanges having tongues on said bellows frame and rivets through said tongues and said inner wall.

5. A bellows frame construction for a folding camera comprising a rectangular inner wall having an inwardly extending wall flange, a bellows having the last fold thereof adjacent to the rear surface of said wall flange, a rectangular bellows frame provided with a plurality of embossings abutting the last fold of said bellows, side flanges integral with said bellows frame and spool carriages swingingly mounted on said side flanges.

6. A bellows frame construction for a folding camera comprising a rectangular inner wall having an inwardly extending wall flange, a bellows having the last fold thereof adjacent to the rear surface of said wall flange, a rectangular bellows frame provided with a plurality of embossings abutting the last fold of said bellows, side flanges integral with said bellows frame, spool carriages swingingly mounted on said side flanges, tongues integral therewith, and rivets between said tongues and said inner wall.

7. As an article of manufacture, a rectangular bellows frame for a camera provided with a plurality of embossings at intervals along the end edges of said frame, said embossings extending only a portion of the distance across the end of said frame, side flanges at right angles to said frame, and tongues extending from said side flanges and provided with holes.

8. As an article of manufacture, a rectangular bellows frame for a camera provided with a plurality of embossings at intervals along the end edges of said frame, said embossings extending only a portion of the distance across the end of said frame, and having an inner flange at right angles around the inner edges of said frame, side flanges at right angles along the outside side edges of said frame, and tongues extending from said side flanges and provided with rivet holes.

Signed at Rochester this 30th day of September, 1930.

NEWTON B. GREEN.